US008564687B2

(12) United States Patent
Goel et al.

(10) Patent No.: US 8,564,687 B2
(45) Date of Patent: Oct. 22, 2013

(54) EFFICIENT DETERMINATION OF AN ILLUMINANT OF A SCENE

(75) Inventors: Anurag Goel, Haryana (IN); Veldandi Muninder, Karimnagar (IN)

(73) Assignee: Nvidia Corporation, Santa Clara, CA (US)

( * ) Notice: Subject to any disclaimer, the term of this patent is extended or adjusted under 35 U.S.C. 154(b) by 949 days.

(21) Appl. No.: 11/744,893

(22) Filed: May 7, 2007

(65) Prior Publication Data

US 2008/0278601 A1    Nov. 13, 2008

(51) Int. Cl.
*H04N 9/73* (2006.01)
*G06K 9/00* (2006.01)

(52) U.S. Cl.
USPC ............ 348/223.1; 348/228.1; 358/516; 382/167

(58) Field of Classification Search
USPC ...................................... 348/223.1
See application file for complete search history.

(56) References Cited

U.S. PATENT DOCUMENTS

| | | | |
|---|---|---|---|
| 3,904,818 A | 9/1975 | Kovac | |
| 4,253,120 A | 2/1981 | Levine | |
| 4,642,684 A | 2/1987 | Alkofer | |
| 4,739,495 A | 4/1988 | Levine | |
| 4,920,428 A | 4/1990 | Lin et al. | |
| 5,446,831 A | 8/1995 | Yamashita et al. | |
| 5,652,621 A | 7/1997 | Adams, Jr. et al. | |
| 5,667,944 A | 9/1997 | Reem et al. | |
| 5,850,470 A | 12/1998 | Kung et al. | |
| 6,038,339 A * | 3/2000 | Hubel et al. | 382/162 |
| 6,377,702 B1 | 4/2002 | Cooper | |
| 6,573,932 B1 * | 6/2003 | Adams et al. | 348/224.1 |
| 6,683,643 B1 | 1/2004 | Takayama et al. | |
| 6,724,422 B1 * | 4/2004 | Werner | 348/187 |
| 6,724,932 B1 | 4/2004 | Ito | |
| 6,785,814 B1 | 8/2004 | Usami et al. | |
| 6,873,727 B2 | 3/2005 | Lopez et al. | |
| 6,900,836 B2 | 5/2005 | Hamilton, Jr. | |
| 6,992,709 B1 * | 1/2006 | Raj et al. | 348/227.1 |
| 7,009,639 B1 | 3/2006 | Une et al. | |
| 7,092,018 B1 | 8/2006 | Watanabe | |
| 7,133,072 B2 | 11/2006 | Harada | |
| 7,184,080 B2 * | 2/2007 | Kehtarnavaz et al. | 348/223.1 |

(Continued)

FOREIGN PATENT DOCUMENTS

| | | |
|---|---|---|
| CN | 1275870 | 12/2000 |
| WO | 2004063989 | 7/2004 |

OTHER PUBLICATIONS

Graham D. Finlayson, Steven D. Hordley, and Paul M. Hubel,"Color by Correlation: A Simple, Unifying Framework for Color Constancy",IEEE Transactions on Pattern Analysis and Machine Intelligence, Nov. 2001,pp. 1209-1221,vol. 23, No. 11.

(Continued)

*Primary Examiner* — Ngoc-Yen Vu

(57) ABSTRACT

An aspect of the present invention reduces computational complexity in determining a illuminant of a scene of interest by selecting only a subset of illuminants from several more potential illuminants, and searching for a current illuminant for a present image frame in only the subset of illuminants. Computational complexity may be reduced due to the searching in fewer illuminants. The subset of illuminants are selected according to various aspects to enhance the probability that the closest matching potential illuminant is accurately determined. The features can be used in image capture devices (ICDs) such as video cameras.

20 Claims, 11 Drawing Sheets

(56) References Cited

U.S. PATENT DOCUMENTS

| | | | |
|---|---|---|---|
| 7,277,575 B2 * | 10/2007 | Baqai et al. ............... 382/162 |
| 7,305,148 B2 | 12/2007 | Spampinato et al. |
| 7,352,894 B2 * | 4/2008 | Dolan et al. ............... 382/162 |
| 7,450,160 B2 | 11/2008 | Takahashi et al. |
| 7,486,844 B2 | 2/2009 | Chang et al. |
| 7,502,505 B2 | 3/2009 | Malvar et al. |
| 7,522,767 B2 * | 4/2009 | Baker et al. ............... 382/167 |
| 7,542,077 B2 | 6/2009 | Miki |
| 7,551,207 B2 * | 6/2009 | Yuyama ............... 348/223.1 |
| 7,576,797 B2 * | 8/2009 | Kehtarnavaz et al. ....... 348/364 |
| 7,593,043 B2 | 9/2009 | Uezono |
| 7,616,810 B2 * | 11/2009 | Dolan et al. ............... 382/162 |
| 7,630,107 B2 | 12/2009 | Ichikawa et al. |
| 7,643,068 B2 | 1/2010 | Hyodo |
| 7,671,910 B2 | 3/2010 | Lee |
| 7,705,892 B2 | 4/2010 | Uezono |
| 7,830,419 B2 | 11/2010 | Sakurai |
| 7,885,458 B1 | 2/2011 | Lin |
| 2002/0015111 A1 | 2/2002 | Harada |
| 2002/0044778 A1 | 4/2002 | Suzuki |
| 2002/0080245 A1 | 6/2002 | Parulski et al. |
| 2002/0105579 A1 | 8/2002 | Levine et al. |
| 2002/0118967 A1 * | 8/2002 | Funston ............... 396/155 |
| 2002/0167596 A1 | 11/2002 | Suzuki et al. |
| 2002/0167602 A1 | 11/2002 | Nguyen |
| 2003/0007076 A1 | 1/2003 | Okisu et al. |
| 2003/0052978 A1 | 3/2003 | Kehtarnavaz et al. |
| 2003/0194125 A1 | 10/2003 | Hubel et al. |
| 2003/0222995 A1 | 12/2003 | Kaplinsky et al. |
| 2004/0001234 A1 | 1/2004 | Curry et al. |
| 2004/0032516 A1 | 2/2004 | Kakarala |
| 2004/0120572 A1 | 6/2004 | Luo et al. |
| 2005/0069201 A1 | 3/2005 | Speigle et al. |
| 2005/0238225 A1 | 10/2005 | Jo et al. |
| 2005/0248671 A1 | 11/2005 | Schweng |
| 2005/0264658 A1 | 12/2005 | Ray et al. |
| 2006/0103728 A1 * | 5/2006 | Ishigami et al. ............... 348/180 |
| 2006/0159336 A1 | 7/2006 | Uezono |
| 2006/0170789 A1 | 8/2006 | Takahashi et al. |
| 2006/0176375 A1 | 8/2006 | Hwang et al. |
| 2006/0232684 A1 | 10/2006 | Miki |
| 2006/0284991 A1 | 12/2006 | Ikeda |
| 2007/0002150 A1 | 1/2007 | Abe |
| 2007/0024719 A1 | 2/2007 | Sakurai |
| 2007/0091188 A1 | 4/2007 | Chen et al. |
| 2007/0132966 A1 | 6/2007 | Widdowson et al. |
| 2007/0139532 A1 | 6/2007 | Sakurai |
| 2007/0165113 A1 | 7/2007 | Suzuki |
| 2007/0229676 A1 | 10/2007 | Tanaka et al. |
| 2007/0247532 A1 | 10/2007 | Sasaki |
| 2008/0143844 A1 | 6/2008 | Innocent |
| 2008/0259186 A1 | 10/2008 | Wang et al. |
| 2008/0297620 A1 | 12/2008 | Goel |
| 2009/0010539 A1 | 1/2009 | Guarnera et al. |
| 2009/0116750 A1 | 5/2009 | Lee et al. |
| 2010/0103289 A1 | 4/2010 | Goel |

OTHER PUBLICATIONS

"Method of Color Interpolation in a Single Sensor Color Camera Using Green Channel Separation" Weerasighe, et al. Visual Information Processing Lab, Motorola Australian Research Center pp. IV-3233-IV3236 date: Sep. 2, 2002.

Kuno et al. "New Interpolation Method Using Discriminated Color Correlation for Digital Still Cameras" IEEE Transac. On Consumer Electronics, vol. 45, No. 1, Feb. 1999, pp. 259-267.

* cited by examiner

US 8,564,687 B2

EFFICIENT DETERMINATION OF AN ILLUMINANT OF A SCENE

BACKGROUND

1. Field of Disclosure

The present disclosure relates generally to image processing in image processing devices such as video cameras and still cameras, and more specifically to efficient determination of an illuminant of a scene in such devices.

2. Related Art

A scene refers to any area/object, the image of which is sought to be captured using an image capture device. An image capture device (ICD) in turn refers to a device such as a still camera or a video camera which is designed to receive light signals from a scene and represent the corresponding image in a suitable format (analog or digital).

In general, light ("incident light") originating from a light source (e.g., Sun, light bulb, reflection from an object) is incident on a scene, and emanates from the scene due to interactions with the objects present in the scene. The interactions include acts such as reflection, absorption, dispersion, diffraction, etc., as is well known in the arts. Some times, a light source itself may be part of a scene. The light ("received light") from the scene is eventually received at an ICD and the image of the scene is captured as an image frame.

The nature of incident light generally depends on various factors such as any intervening medium (e.g., clouds, glass) present between a light source and a scene, the colors and their brightness with which the light source/light sources generate light, etc. Incident light generally is a combination of different colors of same/different brightness. Thus, the incident light has brighter characteristics on clear-sky days in comparison to cloudy situations.

The general type of light incident on a scene is referred to as an illuminant, which is typically dependent on the light source/light sources as well as the factors noted above. Such illuminant is henceforth referred to as "actual illuminant" to differentiate from "potential illuminants" described in the sections below.

There is often a need to determine an actual illuminant of a scene by examining the image of a scene. For example, in an ICD, there are various corrections that may need to be performed based on a determination of actual illuminant. Auto-white balance (AWB) correction is one such example.

As is well known in the relevant arts, AWB correction generally refers to a color correction that may need to be performed on image representation, with the nature of correction depending on the actual illuminant. Often the AWB correction parallels the correction that human eye often performs depending on different illuminants based on which light is received.

One approach to determining an actual illuminant is to store (in an ICD) data representing how a color in a scene would be represented (in the received light) under various illuminants (pre calibrated colors called as reference colors), and comparing the image content for match with these reference colors. Such approaches often require substantial processing resources.

In general, there is a need to reduce the computational complexity (or resource requirements, in general) in determining the actual illuminants, without possibly compromising accuracy at least substantially.

BRIEF DESCRIPTION OF THE DRAWINGS

Example embodiments will be described with reference to the following accompanying drawings, which are described briefly below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

Figure 1:
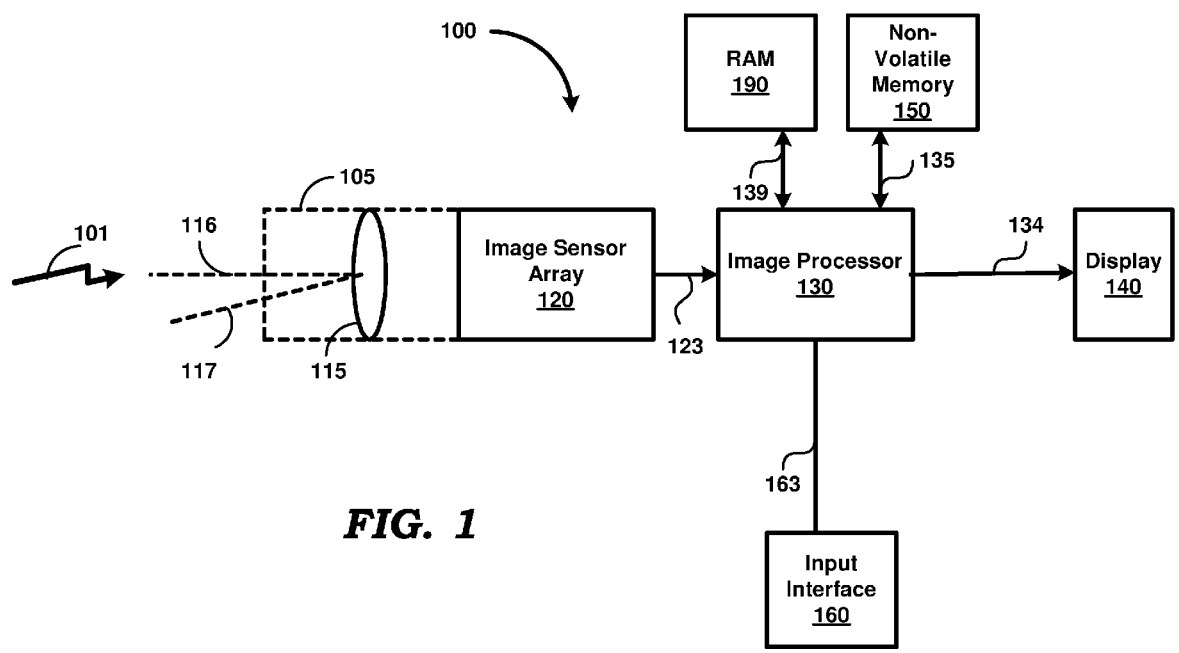
FIG. 1 is a block diagram of an image capture device (ICD) illustrating an example embodiment in which several aspects of the present invention may be implemented.

An aspect of the present invention reduces computational complexity in determining an illuminant for a scene of interest by selecting only a subset of illuminants from several more potential illuminants, and checking for a current (closest matching) illuminant for a present image frame in only the subset of illuminants. Computational complexity may be reduced due to the checking in fewer illuminants.

In an embodiment, the potential illuminants are ordered by corresponding correlated color temperatures, and the subset of illuminants is designed to contain either illuminants in odd positions ("odd group") or illuminants in even positions ("even group"). Thus, the computational complexity may be reduced by half while the accuracy may also be correspondingly compromised.

Another aspect of the present invention enhances the accuracy by including checking for a match with additional potential illuminants as well. For example, when processing an earliest frame in a sequence of frames, two potential illuminants (located in the other group), which are adjacent to the closest matching illuminant in a present group, may also be considered for a closer match.

On the other hand, when processing an immediately following frame, the closest matching illuminant for the previous frame as well as the other group are examined for closest match for the immediately following frame in one embodiment. Further efficiency may be attained by not considering the adjacent illuminants considered for the earliest frame noted above.

According to another aspect of the present invention, once the closest matching illuminants for two early frames in a sequence are determined accurately, for example, as noted above, for each frame thereafter, only the closest matching illuminant of a previous frame and a pair of adjacent (e.g., on either side) illuminants are checked for closest matching illuminant of each frame until either the scene or an actual illuminant illuminating the scene are deemed to have changed.

In one embodiment, the scene and/or illuminant are deemed to have changed if a difference of error metrics associated with respective successive frames exceeds a threshold, with each error metric representing a measure of a difference of (at least a portion of) the frame from information indicating how respective colors on a scene would manifest in an image capture device.

According to another aspect of the present invention, a closest matching illuminant for a previous frame is also provided as the closest matching illuminant for a present frame if the scene or the actual illuminant illuminating the scene has not changed. The closest matching illuminant for an immediately prior frame before such a feature is operative may be determined as follows.

In an embodiment, the potential illuminants are partitioned into multiple subsets. Each received image frame is compared with a corresponding subset and a closest matching illuminant of a previous image frame, until all the subsets are searched. The closest matching illuminant when the final subset is searched is viewed as a final illuminant, and provided as the closest matching illuminant until the scene or the actual illuminant is deemed to have changed.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well known structures or operations are not shown in detail to avoid obscuring the features of the invention.

2. Image Capture Device (Camera)

FIG. 1 is a block diagram of an image capture device, in this example a camera, illustrating an example embodiment in which several aspects of the present invention may be implemented. Camera 100 is shown containing lens enclosure 105, lens assembly 115, image sensor array 120, image processor 130, display 140, non-volatile memory 150, input (I/P) interface 160 and RAM 190. Only the components as pertinent to an understanding of the operation of the example embodiment are included and described, for conciseness and ease of understanding. Each component of FIG. 1 is described in detail below.

Lens enclosure 105 (denoted by dotted lines) is shown housing lens assembly 115 and image sensor array 120, and is generally designed to shield extraneous (i.e., other than the light being received via the lens assembly) light from being incident on image sensor array 120 (in general, capturing medium). Lens assembly 115 may contain one or more lenses, which can be configured to focus light rays (denoted by arrow 101) from a scene to impinge on image sensor array 120.

Image sensor array 120 may contain an array of sensors, with each sensor generating an output value representing the corresponding point (small portion or pixel) of the image, and proportionate to the amount of light that is allowed to fall on the sensor. The output of each sensor is converted to a corresponding digital value (for example, in RGB format). The digital values, produced by the sensors are forwarded on path 123 to image processor 130 for further processing.

Display 140 displays an image frame in response to the corresponding display signals received from image processor 130 on path 134. Display 140 may also receive various control signals (not shown) from image processor 130 indicating, for example, which image frame is to be displayed, the pixel resolution to be used etc. Display 140 may also contain memory internally for temporary storage of pixel values for image refresh purposes, and is implemented in an embodiment to include an LCD display.

Input interface 160 provides a user with the facility to provide inputs, for example, to select features such as whether auto-white balance (AWB) correction is to be enabled/disabled. The AWB correction may be performed only if the feature is enabled. The user may be provided the facility of any additional inputs, as described in sections below.

RAM 190 stores program (instructions) and/or data used by image processor 130. Specifically, pixel values that are to be processed and/or to be used later may be stored in RAM 190 via path 139 by image processor 130.

Non-volatile memory 150 stores image frames received from image processor 130 via path 135. The image frames may be retrieved from non-volatile memory 150 by image processor 130 and provided to display 140 for display. In an embodiment, non-volatile memory 150 is implemented as a flash memory. Alternatively, non-volatile memory 150 may be implemented as a removable plug-in card, thus allowing a user to move the captured images to another system for viewing or processing or to use other instances of plug-in cards.

Non-volatile memory 150 may contain an additional memory unit (e.g. ROM, EEPROM, etc.), which store various instructions, which when executed by image processor 130 provide various features of the invention described herein. In general, such memory units (including RAMs, non-volatile memory, removable or not) from which instructions can be retrieved and executed by processors are referred to as a computer (or in general, machine) readable medium. Further, RAM 190 and non-volatile memory 150 (together or individually) represent examples of memory units from which image processor 130 can access data and instructions to provide various features of the present invention.

Image processor 130 forwards pixel values received on path 123 to path 134 to enable a user to view the scene presently pointed by the camera. Further, when the user 'clicks' a button (indicating intent to record the captured image on non-volatile memory 150), image processor 130 causes the pixel values representing the present (at the time of clicking) image to be stored in memory 150.

It may be appreciated that the image frames thus captured may need to be corrected based on the illuminant of the scene captured, Auto White Balance (AWB) being one such correction. This requires the determination of the actual illuminant of the scene captured.

Image processor 130 may operate to determine the actual illuminant of a scene by comparing the stored color characteristics of a predetermined number of illuminants with the color characteristics of the captured image frame and identifying the closest match. The color characteristics may include the RGB characteristics of, among many possible ones, skin, white and green under the illuminants considered.

The process of identification of the actual illuminant by the image processor, as described above, may put excessive computational load on the image processor. An ICD implemented according to several aspects of the present invention, reduces the computational load as described below with examples.

3. Efficient Determination of an Illuminant of a scene

Figure 2:
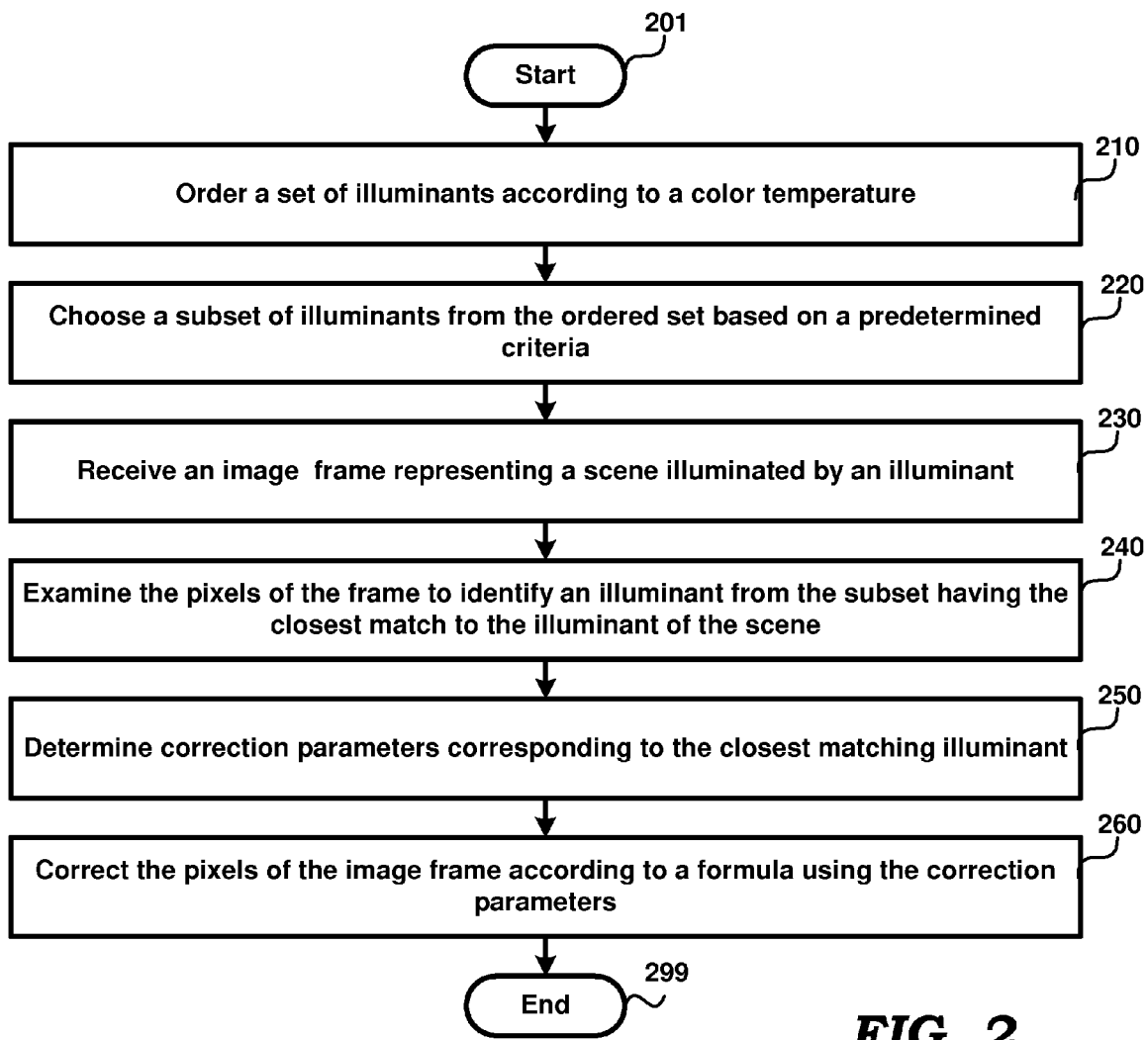
FIG. 2 is a flowchart illustrating the manner in which efficient an illuminant of a scene is determined in one embodiment.

FIG. 2 is a flowchart illustrating the manner in which efficient determination of an illuminant of a scene is achieved in an embodiment. The flowchart is described with respect to FIG. 1, merely for illustration. However, various features can be implemented in other environments and other components. Furthermore, the steps are described in a specific sequence merely for illustration.

Alternative embodiments in other environments, using other components, and different sequence of steps can also be implemented without departing from the scope and spirit of several aspects of the present invention, as will be apparent to one skilled in the relevant arts by reading the disclosure provided herein. The flowchart starts in step 201, in which control passes immediately to step 210.

In step 210, image processor 130 orders a predetermined set of illuminants according to a correlated color temperature. The set of illuminants may represent the illuminants likely to be encountered by target ICDs. As is well known in the relevant arts, the temperature in degrees Kelvin at which the hue of the emissions from a heated black-body radiator matches the hue of an illuminant, is that illuminant's correlated color temperature. In an embodiment, the ordering is done according to ascending order of their correlated color temperature. Alternatively, they may be ordered in the descending order of their correlated color temperature or based on other considerations.

In step 220, image processor 130 identifies a subset of illuminants from the ordered set based on predetermined criteria. The subset may be identified such that the number of potential illuminants to be compared and hence the computational load is reduced while ensuring a reasonable probability that the identified illuminant is the closest among the set of illuminants, to the actual illuminant.

One such subset is formed by selecting every alternate illuminant of the ordered set of illuminants. This is achieved through selecting all the illuminants in the even position in the ordered set of illuminants. Alternatively, all the illuminants in the odd position may be selected. Steps 210 and 220 represent an example approach to selecting a subset of the available illuminants. However, other approaches, as suited to the specific environments and requirements, may be used for selecting the subset without departing from the scope and spirit of several aspects of the present invention.

In step 230, image processor 130 receives an image frame representing a scene illuminated by an illuminant. The image frame may be received in the form of pixel values, with each pixel representing a color of the corresponding point (small portion of the image).

In step 240, image processor 130 identifies an illuminant among the illuminants in the subset selected above, which provides the closest match to the illuminant of the scene. In an embodiment (described below), the image processor starts the identification by determining a closeness measure for each of the illuminants in the selected subset.

The closeness measure generally is a numerical representation of how similar at least a portion of an image is in comparison to data representing how a color in a scene would be represented (in the received light) under various illuminants.

Several approaches for computing the closeness measure are well known in the relevant arts. In an embodiment, the data representing how a set of colors would be represented when illuminated by each of the potential illuminants, is stored (or made available otherwise from externally or by appropriate logic) in the ICD. The set of colors are chosen such that they are likely to be present in a large proportion of the images captured by ICDs under normal use. In an embodiment, the set of colors comprise white, skin and green.

In one embodiment, each pixel of a received image frame is examined to determine whether the pixel is one of white, skin or green color by checking whether the pixel value is within a certain threshold of the corresponding color value for a potential illuminant (say illuminant A). If it is within such a threshold, the corresponding color may be termed as a matching color. The difference of the pixel value from the ideal color value for the matching color for illuminant A is then determined. The weighted differences may be summed for each of the three colors for illuminant A, in addition to maintaining a respective count of the number of pixels for the corresponding color (TotalWhiteCount, TotalSkinCount and TotalGreenCount).

The closeness match is then determined as having a positive correlation with the number of matches found for respective color for illuminant A, and a negative correlation with the sum of differences for that color. In other words, the closeness measure may be computed to be higher if more pixels are matching respective colors closely with the pre-stored ideal value for the respective colors. Various formulas can be employed according to such a principle.

Image processor 130 may then search the image frame for pixel values (portions of image frame) potentially matching one of the set of colors, compares the colors found with the stored values for the colors when illuminated by each of the potential illuminants in the selected subset, and quantifies the result of the comparison as a closeness measure. The illuminant from the selected subset of potential illuminants, having the maximum closeness measure, may be identified as the illuminant of the scene.

In step 250, the image processor 130 determines the correction parameters corresponding to the identified illuminant, to be applied to the image frame. In an embodiment, the correction to be applied is the auto-white balance (AWB) correction. The correction parameters may be generated by simply mapping the illuminant to a set of values, or by using more complex computations, as is well known in the relevant arts.

In step 260, image processor 130 corrects the pixels of the image frame according to the correction parameters for AWB in respect of the chosen illuminant. The flow chart ends in step 299.

It should be appreciated that the approaches described above may be extended in various ways to reduce any inaccuracies that may result due to the use of subset of the illuminants while identifying the closest illuminant. Some of such approaches are described in sections below.

At least some of these approaches may be implemented within image processor 130. Accordingly, the description is continued with the internal details of image processor 130 in one embodiment.

4. Image Processor

Figure 3:
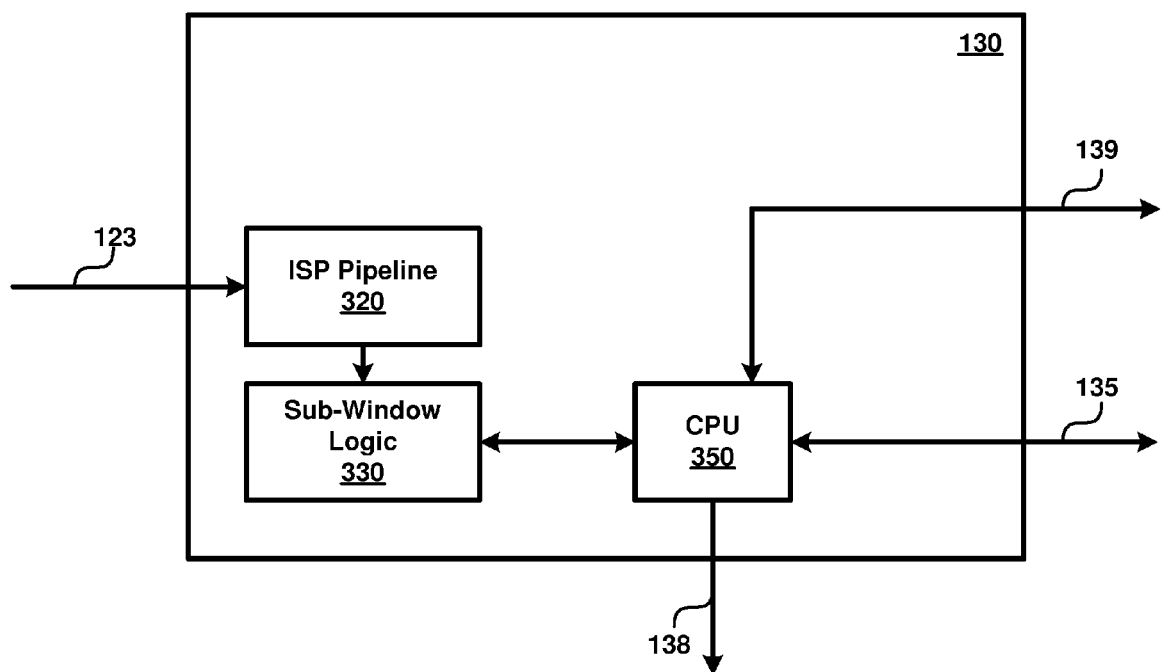
FIG. 3 is a block diagram of the internal details of an image processor operating to determine an illuminant of a scene in one embodiment.

FIG. 3 is a block diagram of image processor 130 in one embodiment. Merely for illustration, several features are described below with respect to the components of FIG. 3. However the features can be implemented in various other processors as well, without departing from the scope and spirit of several aspects of the present invention. Image processor 130 is shown containing image signal processor (ISP) pipeline 320, sub-window logic 330, and central processing unit (CPU) 350. Image processor 130 may contain other components/blocks also, but are not shown as not being relevant to an understanding of the described embodiment. Each component is described in detail below.

ISP pipeline 320 receives a stream of pixel values representing an entire image frame (row wise) on path 123. The pixel values may be received directly from image sensor array 120 (of FIG. 1). ISP pipeline 320 may be implemented as a shift register, and shifts in pixels received on path 123, and transfers the pixels to buffer registers or other internal buffer, from which CPU 350 may obtain pixel/sub-sampled pixel values via sub-window logic 330. ISP pipeline 320 may perform various operations on the stored pixels such as optical black restoration (subtracting a black color reference level from each of the pixels), sensor linearization (which removes non-linear effects of image sensor array 120), white balance (either automatically or based on user inputs), color correction (transformation of pixel values from one color space to another specific color space), gamma correction, demosaicing (R/G/B pixel signals obtained from Bayer color filter array converted to simultaneous R/G/B component values), etc.

Sub-window logic 330 receives control inputs from CPU 350 specifying dimensions and locations of one or more sub-windows (e.g., in the form of rectangular areas) in the captured image that are to be sub-sampled. For each of a group (for example, nine adjacent pixels) of pixel values in the sub-window, sub-window logic 330 computes the average of the pixel values in the group, and generates a corresponding single pixel value having the computed average value. The 'averaged' pixels thus generated form a sub-sampled version of portion of the image in the sub-window, and the sub-sampled version is provided by sub-window logic 330 to CPU 350. In an embodiment, sub-window logic 330 receives a 800×600 image frame, and generate a one pixel for each 8×8 pixel area. The resulting 100*75 image frame may be provided to CPU 350.

CPU 350 may operate on the sub-sampled image frame to determine an illuminant from a subset of potential illuminants, providing the closest match to the illuminant of the scene, as described with examples, in detail below. Operation on such sub-sampled images reduces the computational requirements in CPU 350. Alternative embodiments can be implemented to operate in different ways (e.g., on the original image frame, without sub-sampling). Irrespective, CPU 350 may determine an illuminant from a subset of potential illuminants, providing the closest match to the illuminant of the scene, by examining/processing the image data (either in sub-sampled form or otherwise), as described with examples below.

ISP pipeline 320 may perform AWB adjustment by processing the pixel values received, with the adjustment parameters corresponding to the illuminant determined by CPU 350. As noted above, in an embodiment, the potential illuminants are ordered according to correlated color temperature in determining the actual illuminant. Some of the potential illuminants in an example embodiment are described below.

5. Potential Illuminants

Figure 4:
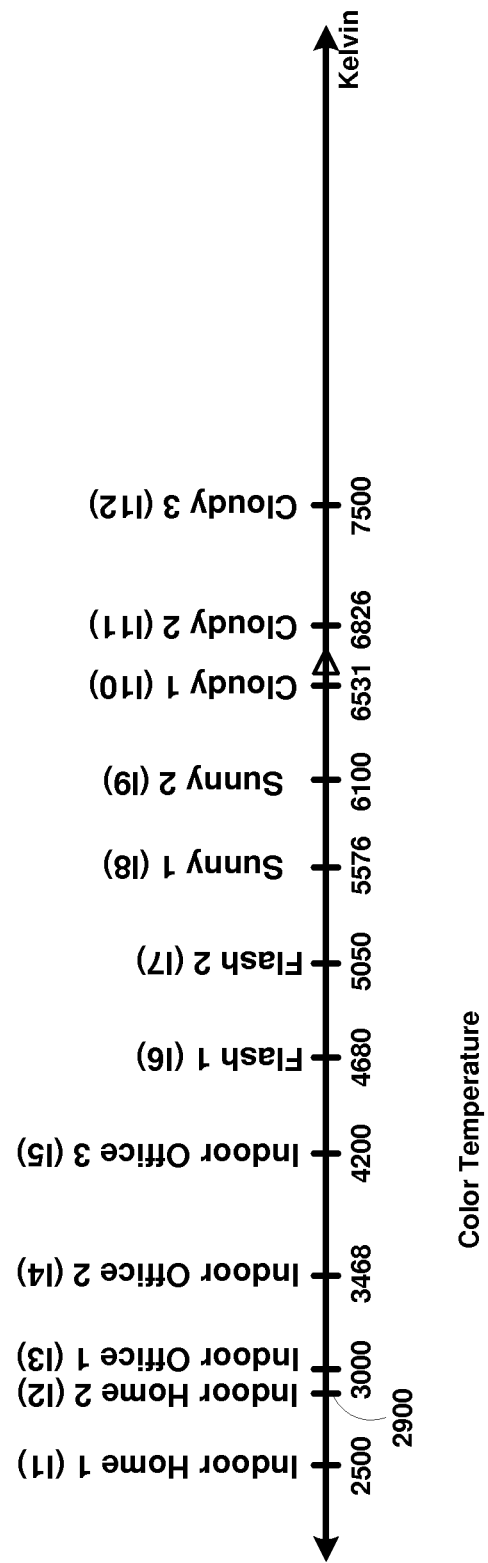
FIG. 4 depicts an example set of illuminants arranged according to their correlated color temperature.

FIG. 4 is a graph showing some example illuminants and corresponding correlated color temperatures. There are shown 12 illuminants, with respective correlated color temperatures of 2500, 2900, 3000, 3468, 4200, 4680, 5050, 5576, 6100, 6531, 6826 and 7500 and identified respectively as Indoor Home1, Indoor Home2, Indoor Office1, Indoor Office2, Indoor Office3, Flash1, Flash2, Sunny1, Sunny2, Cloudy1, Cloudy2, and Cloudy3. The illuminants are respectively labeled as I1 to I12 for ease of description.

It may be appreciated that some of the colors in a scene may not be detected in CPU 350 under certain illuminants. For example, when an image frame from a scene illuminated by a white illuminant (such as Sunlight) is received, all colors may be detected. On the other hand, when an illuminant has lower correlated color temperature (more reddish hue) or higher correlated color temperature (more bluish hue) than white light, some of the colors may have very little spectral power density. Accordingly, such colors may not be detected for the corresponding correlated color temperatures.

Thus, for each potential illuminant in the set of illuminants, data representing how each of the corresponding detectable colors appear when illuminated by that illuminant, is made available to the image processor in an ICD. In an embodiment, the set of colors comprise skin, green and white.

While the examples herein are described with this set of illuminants and correlated color temperatures merely for illustration, it may be appreciated that several features of the invention can be practiced with more or less illuminants with other correlated color temperatures or other characteristics, etc., as will be apparent to one skilled in the relevant arts by reading the disclosure provided herein.

The manner in which an actual illuminant of a scene can be determined is described below with examples.

6. An Example Approach for Determining an Illuminant of a Scene

Figure 5A:
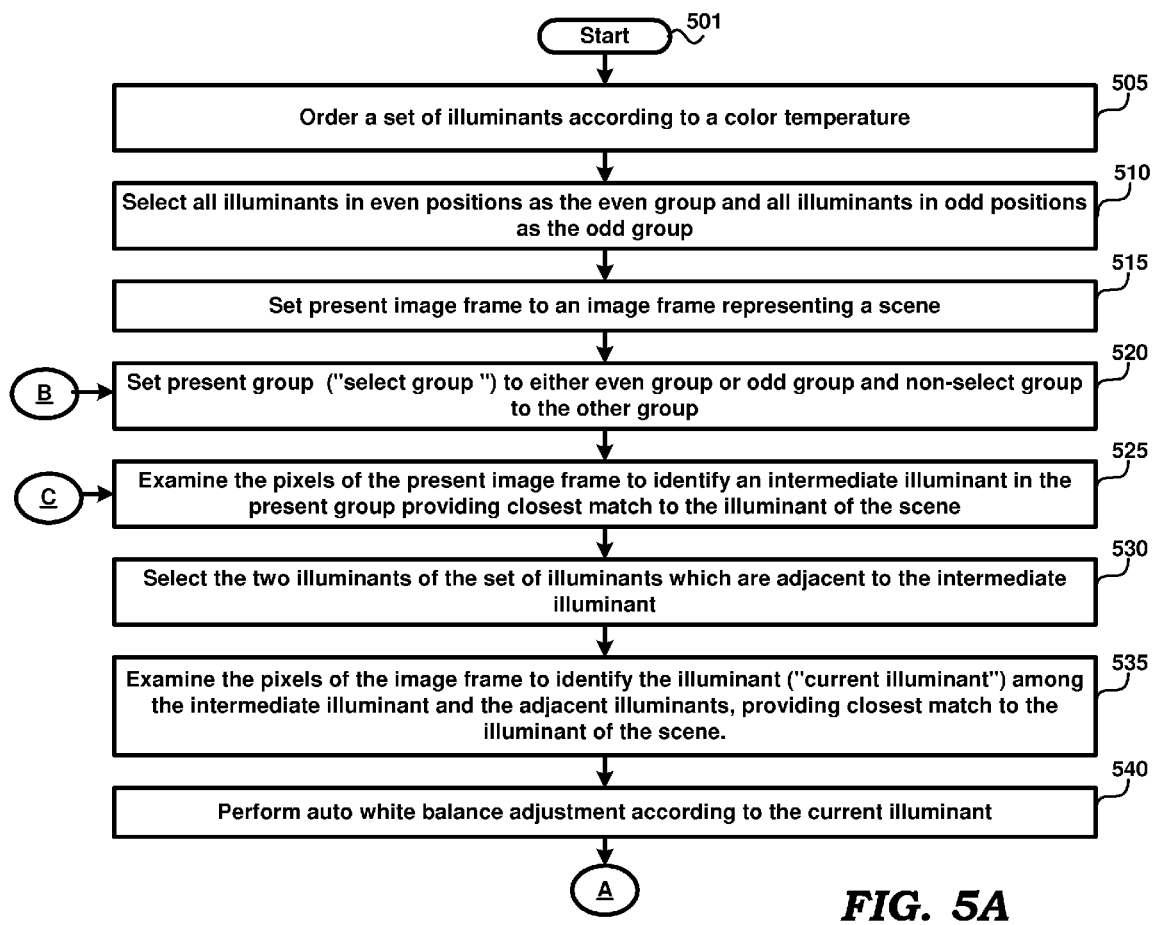
FIGS. 5A and 5B together illustrate an example approach for efficient determination of an illuminant of a scene in an embodiment of the present invention.
Figure 5B:
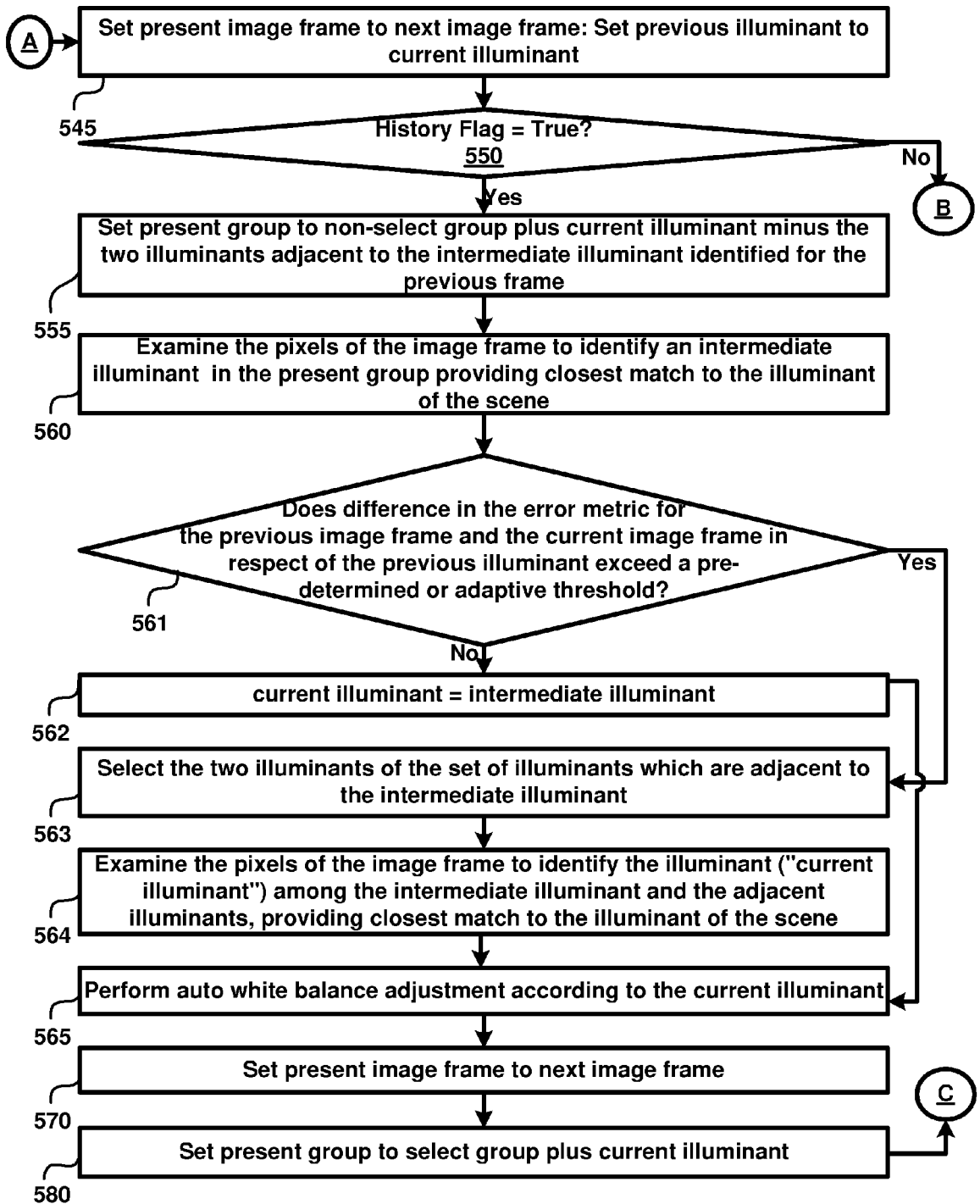

FIGS. 5A and 5B together include a flowchart illustrating an example approach to determine an illuminant of a scene. The flowchart is described with respect to FIGS. 1-4 merely for illustration. However, various features can be implemented in other environments and other components. Furthermore, the steps are described in a specific sequence merely for illustration.

Alternative embodiments in other environments, using other components, and different sequence of steps can also be implemented without departing from the scope and spirit of several aspects of the present invention, as will be apparent to one skilled in the relevant arts by reading the disclosure provided herein. The flowchart starts in step 501, in which control passes immediately to step 505.

In step 505, CPU 350 orders a set of predetermined potential illuminants according to a correlated color temperature, for example, as described above with respect to step 210. The illuminants may be ordered as shown above with respect to FIG. 4.

In step 510, CPU 350 places all illuminants in even positions in the ordered set into an even group and the remaining illuminants into an odd group. With respect to FIG. 4, the even group may contain illuminants I2, I4, I6, I8, I10 and I12 and the odd group may contain illuminants I1, I3, I5, I7, I9 and I11.

In step 515, CPU 350 receives an image frame, whose scene illuminant is to be identified, and sets a present image frame (which is processed, as described below) to the received image frame. The image frame may be received in the form of pixel values, with each pixel representing a color of the corresponding point (small portion of the image). The image frame may be received in sub-sampled or original form.

In step 520, a present group is set to one of either odd group or even group. The present group represents the subset of potential illuminants (with possible additions later, as described below with an example), which are considered for a match in a present iteration. The group thus selected is referred to as a select group and the other group is referred to as the non-select group. For illustration, it is assumed that the present group is set to even group.

In step 525, CPU 350 identifies an intermediate illuminant among the illuminants in the present group, which provides the closest match to the illuminant of the scene. The identification may be carried out by computing a closeness measure for each of the illuminants in the select group, and identifying the illuminant in the select group with the maximum closeness measure, for example, as described before.

In step 530, CPU 350 selects the two illuminants which are adjacent to the intermediate illuminant identified above, in the ordered set. For example, assuming I4 is selected as an intermediate illuminant, I3 and I5 are the two adjacent illuminants. In case of illuminants at the edge (e.g., I12), the two preceding (i.e., I10 and I11) or following illuminants may be chosen. More or fewer adjacent illuminants may be selected. In general, addition of more illuminants enhances the probability of a close match, but increases the computational complexity.

In step 535, CPU 350 identifies the illuminant among the three illuminants (intermediate illuminant, two adjacent illuminants), which provides the closest match to the illuminant of the scene, from the closeness measures, as described before. The closest matching illuminant is referred to as a current illuminant since this illuminant is deemed to be the actual illuminant (or closest matching illuminant thereto) for the processed image frame.

In step 540, CPU 350 applies the adjustment (to the pixel values received from image sensor array 120) using adjustment parameters corresponding to the identified current illuminant, to effect the desired AWB correction. The white balancing may be performed using one of several known techniques once the actual illuminant is determined.

The adjustment parameters may themselves be retrieved from a memory, or further refined based on factors such as how close the pixel values of the scene are to the reference colors (corresponding to the identified current illuminant, etc.). Since the actual illuminant is determined without requiring user to identify the illuminant, the approach may be referred to as AWB (Auto White Balance).

In step 545, CPU 350 receives the next image frame whose scene illuminant is to be identified. CPU 350 sets the value for previous illuminant to the current illuminant (which is the illuminant identified to be providing the closest match to the illuminant of the earlier image frame in step 535). The value of the current illuminant is stored for further processing as described below.

In step 550, CPU 350 checks a history flag, which indicates whether the result of previous identification of illuminants should influence the identification of the current illuminant. The history information can be used to attain any desired benefit (reduced computation, increased precision in determining the actual illuminants, etc.). In the present example, such use of history information may lead to a robust and efficient (enhanced probability of a close match) identification of the illuminant of the scene. If the history flag is set to 'True', the flowchart continues to step 555. If the History flag is 'False', control goes back to step 520.

In step 555, the non-select group, which is the odd group in the illustrative example, is set as the present group (by CPU 350). The two adjacent illuminants, selected in step 530, may be removed from the present group to reduce the computational complexity further. Thus, the present group may now contain those illuminants which have not been considered for selecting the illuminant which provides the closest match to the illuminant of the previous image frame. The current illuminant identified for the earlier frame is added to the present group.

In Step 560, CPU 350 identifies an intermediate illuminant among the illuminants in the present group, which provides the closest match to the illuminant of the scene. The identification may be carried out in a manner similar to ones described for step 525.

In step 561, CPU 350 checks whether the scene and/or illuminant has changed, from the image of the earlier image frame to the image of the present image frame. CPU 350 determines a respective error metrics of the previous illuminant for the current frame and the previous frame. For example, if the current illuminants are determined to be C1 and C2 for respective successive frames F1 and F2, one error metric is computed for (C1 and F1 combination) and another error metric is computed for (C1 and F2 combination).

The error metric is a numerical representation of how dissimilar the portion of an image relied upon in determining closeness, is in comparison to data representing how a color in a scene would be represented (in the received light) for the corresponding illuminant. The error metric may be viewed as having negative correlation with the closeness measure described in sections above.

The error metric may be determined in a number of ways known in the arts. In one embodiment, the error metric is derived from the closeness measure, described before. CPU 350 may determine the error metric for the previous frame in step 535 and store it. Then CPU 350 determines the error metric for the current image frame, with respect to the previous illuminant.

Thereafter, CPU 350 computes the difference between the two error metrics determined earlier. If the difference thus computed exceeds a threshold, the scene and/or the illuminant is deemed to have changed and the processing continues from 563. The threshold may be a fixed threshold, or may be an adaptive threshold (which is determined dynamically).

In one embodiment, the adaptive threshold is computed as described below. CPU 350 determines an error metric of the previous illuminant for the previous frame, as described in step 561 (or the value determined in step 561 may be stored). An illuminant is selected for determining the adaptive threshold. The illuminant closest to the previous illuminant (identified through the closeness measure described before) is selected. CPU 350 determines an error metric of the selected illuminant for the previous frame. Then CPU 350 determines the absolute value of the difference of the two error metrics. CPU 350 also determines the absolute value of the difference of the correlated color temperatures of the previous illuminant and the selected illuminant. The adaptive threshold is a weighted ratio of the absolute value of difference in error metrics for the previous frame to the absolute value of difference in correlated color temperatures, of the previous illuminant and the selected illuminant. In one embodiment, the weight (scale factor) is a function of the color temperatures of the previous illuminant and the selected illuminant.

If CPU 350 determines that the scene and/or the illuminant has not changed, processing continues to 562. In step 562, the intermediate illuminant identified in step 560 is set as the current illuminant. Control then passes to step 565.

Steps 563 and 564 may be performed similarly to steps 530 and 535 to select two illuminants which are adjacent to the intermediate illuminant, and identify the current illuminant from the intermediate illuminant and the two adjacent illuminants. Thus, when a scene is deemed to have changed, adjacent illuminants are added to expand the search for a closer match.

In Step 565, CPU 350 performs AWB adjustment in a manner similar to that described earlier with respect to step 540.

In step 570, CPU 350, after completing one iteration, continues to the next iteration by receiving the next image frame whose scene illuminant is to be identified. Control passes to step 580.

In step 580, the select group, which is the even group in the illustrative example, is set as the present group. The current illuminant identified for the earlier frame is added to the present group. The processing continues from step 525, for the next iteration.

It may thus be appreciated that each iteration processes two frames, with an even or odd group, along with the current illuminant for a previous frame and adjacent illuminants of intermediate illuminant, being considered in processing the first frame. To process the second image frame, illuminants not considered for the first frame, as well as the current illuminant of the first/previous frame, are considered. As a result, at least when a scene does not change, the closest one of the potential illuminants may always be considered for each frame in the steady state.

If it is determined that a change in the scene and/or illuminant has occurred, adjacent illuminants of an intermediate illuminant also may be considered for processing the second image frame.

The description is continued with respect to additional examples for determining the illuminant of a scene.

7. Another Example Approach for Determining an Illuminant of a Scene

Figure 6A:
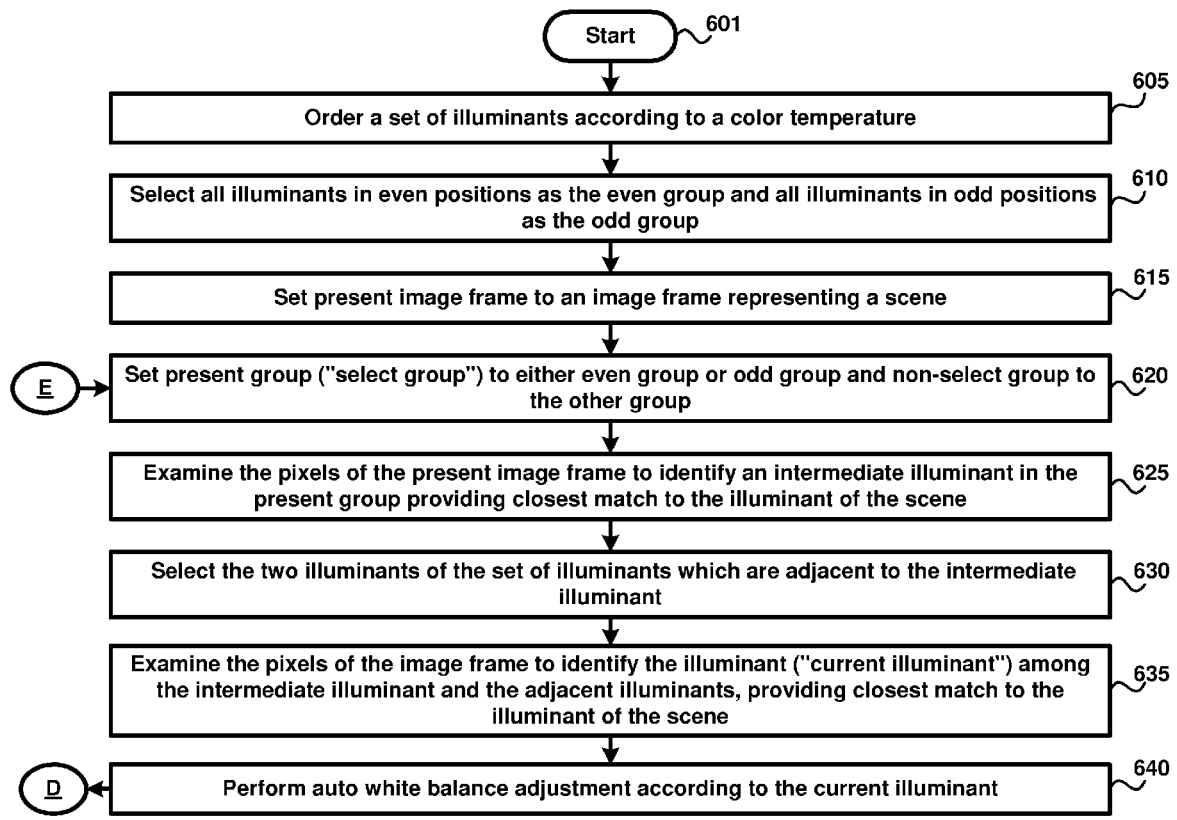
FIGS. 6A and 6B together illustrate an example approach for efficient determination of an illuminant of a scene in another embodiment of the present invention.
Figure 6B:
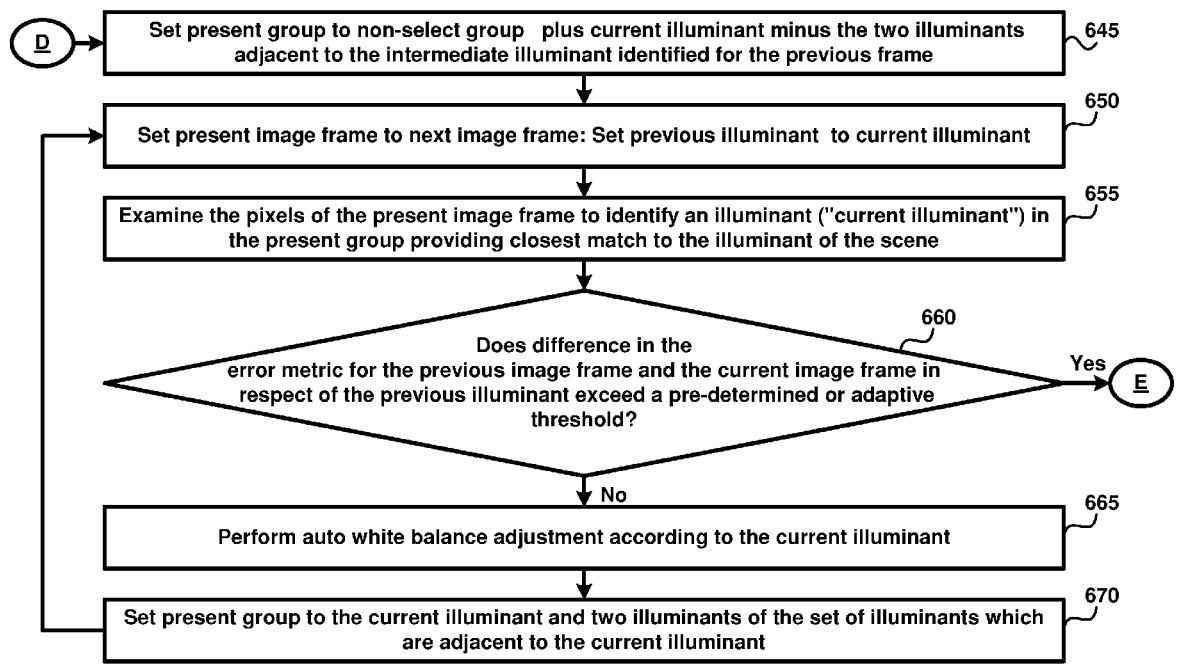

FIGS. 6A and 6B together include a flowchart illustrating another example approach of a manner in which an illuminant of a scene may be determined. The flow chart is described with respect to FIGS. 1-5 merely for illustration. However, various features can be implemented in other environments and other components. Further more, the steps are described in a specific sequence merely for illustration.

Alternative embodiments in other environments, using other components, and different sequences of steps can also be implemented without departing from the scope and spirit of several aspects of the present invention, as will be apparent to one skilled in the relevant arts by reading the disclosure provided herein. The flowchart starts in step 601, in which control passes immediately to step 605.

Steps 605, 610, 615, 620, 625, 630, 635, 640 and 645 may be performed respectively similar to steps 505, 510, 515, 520, 525, 530, 535, 540 and 555 described above for FIG. 5 except that some of the differences or additional information is described below. This example approach does not check a History flag, as was the case for FIG. 5 above.

At the end of step 640, the current illuminant is determined for a first frame considering either odd or even group (in addition to the adjacent set of illuminants to the intermediate illuminants).

In step 650, CPU 350 receives the next image frame. CPU 350 sets the value for previous illuminant to the current illuminant (which is the illuminant identified to be providing the closest match to the illuminant of the earlier image frame in step 635/655). The value of the current illuminant is stored for further processing as described below.

In step 655, CPU 350 identifies an illuminant among the illuminants in the present group, which provides the closest match to the illuminant of the scene. The identification may be performed as described above with respect to step 560.

In step 660, CPU 350 checks whether the scene and/or illuminant has changed, from the image of the earlier image frame to the image of the present image frame. The checking may be performed similarly to step 561 above. If the scene and/or the illuminant is deemed to have changed, the processing starts from 620.

In step 665, CPU 350 performs AWB adjustment, which may be performed similar to step 540 of FIG. 5 described above.

In step 670, the present group is set to the current illuminant and the two illuminants in the set of illuminants which are adjacent to the current illuminant. Assuming that the searches with respect to the two image frames in steps 625-655 resulted in the closest potential illuminant, and also assuming that the scene does not change, searching in three illuminants (current illuminant determined for the previous frame and two adjacent illuminants) may provide satisfactory results. Due to the searches in only few (three) illuminants, the computational requirements are reduced.

Thus, unless there is a change of scene and/or the illuminant of the scene, searching through the illuminant identified in step 655 and two adjacent illuminants will give a high probability of identifying the closest match to the illuminant of the scene from these three illuminants, while reducing the computational complexity by a substantial percentage.

The iteration continues through steps 650-670 unless CPU 350 detects a change of scene and/or illuminant in step 660. When the scene/illuminant changes, processing continues from step 620.

It should be appreciated that the approach described above may be extended in various ways to reduce any inaccuracies that may result due to the use of subset of the illuminants while identifying the closest illuminant, or to further reduce the computational complexity or both. Some more of such approaches are described in sections below. One such approach is to set the present group in step 670 to just the current illuminant or to current illuminant and four illuminants of the set of illuminants which are adjacent to the current illuminant.

8. One More Example Approach for Determining an Illuminant of a Scene

Figure 7:
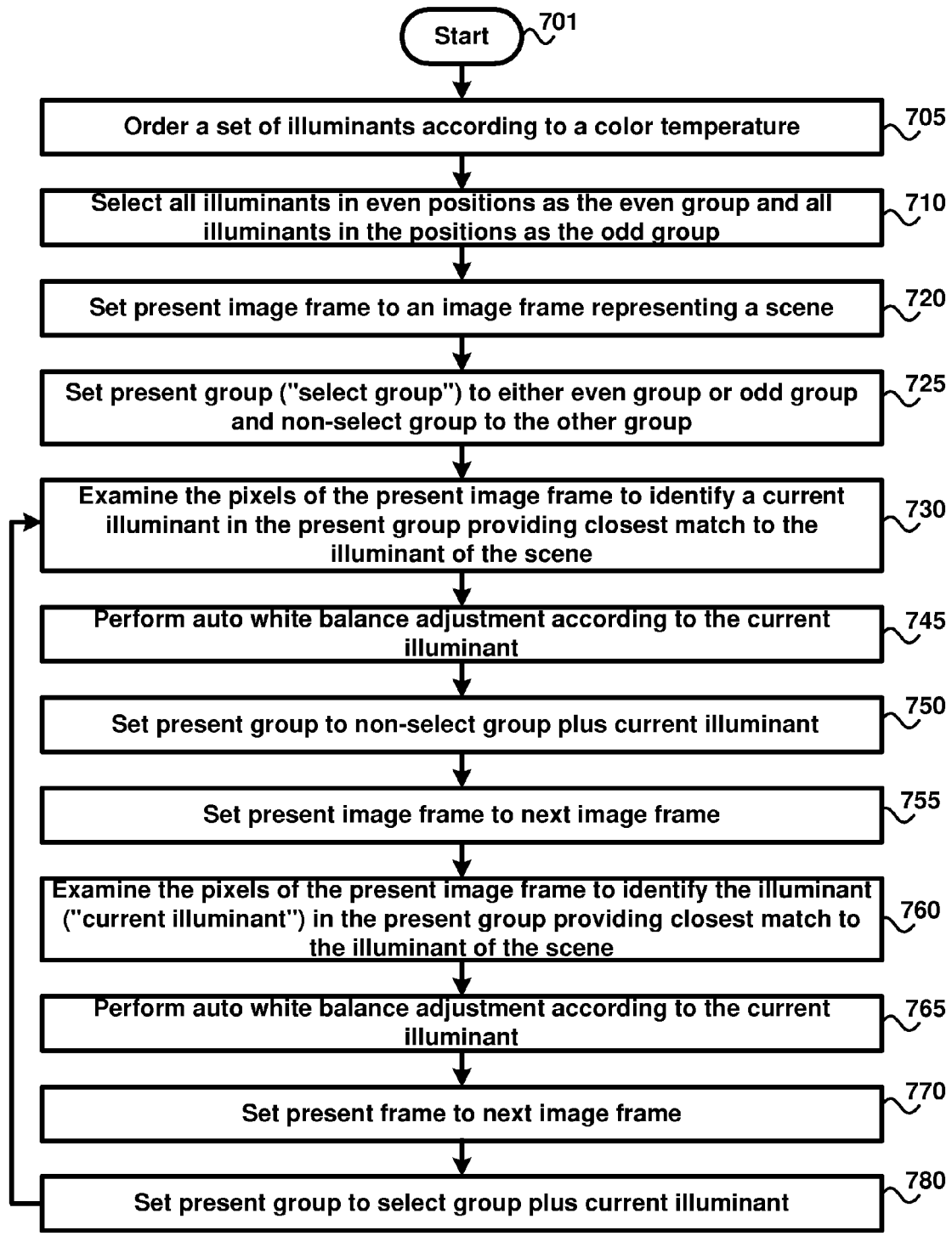
FIG. 7 is a flowchart illustrating an example approach for efficient determination of an illuminant of a scene in yet another embodiment of the present invention.

FIG. 7 is a flowchart illustrating one more example approach using which an illuminant of a scene is determined. The flow chart is described with respect to FIGS. 1-6 merely for illustration. However, various features can be implemented in other environments and other components. Further more, the steps are described in a specific sequence merely for illustration.

Alternative embodiments in other environments, using other components, and different sequences of steps can also be implemented without departing from the scope and spirit of several aspects of the present invention, as will be apparent to one skilled in the relevant arts by reading the disclosure provided herein. The flowchart starts in step 701, in which control passes immediately to step 705.

Steps 705, 710, 720, 725, 730, 745, 760 and 765 may be performed respectively similar to steps 605, 610, 615, 620, 655, 640, 655 and 665 described above for FIG. 6 except that some of the differences or additional information is described below.

In step 730, CPU 350 identifies the current illuminant from the present group in a manner similar to step 655 of FIG. 6. In comparison to the flowcharts of FIGS. 5 and 6, the current illuminant for the present frame is determined with reduced computational complexity since the 'intermediate illuminant' is not evaluated prior to computing the 'current illuminant'.

In step 745, CPU 350 performs AWB adjustment, which may be performed similar to step 665 of FIG. 6 described above.

In step 750, CPU 350 sets the present group to the non select group, containing the potential illuminants which were not considered in the previous frame. The current illuminant identified for the previous image frame, is added to the present group.

In step 755, CPU 350 receives the next image frame whose scene illuminant is to be identified. In step 760, CPU 350 identifies the current illuminant from the present group in a manner similar to step 655 of FIG. 6.

In step 765, CPU 350 performs AWB adjustment, which may be performed similar to step 665 of FIG. 6 described above. In step 770, the next iteration is started. Present group is set to the select group plus the current illuminant and CPU 350 receives the next image frame whose scene illuminant is to be identified. In step 780, the present group is set to select group plus current illuminant. Processing continues from step 730.

Thus the information of current illuminant of a frame is used in the determination of the illuminant of the next frame, thereby increasing the probability of accurate determination when the scene does not change. The computational complexity is reduced due to the consideration of only (approximately) half of the potential illuminants for each frame.

The description is continued with respect to another example approach for determining an illuminant of a scene.

Figure 8A:
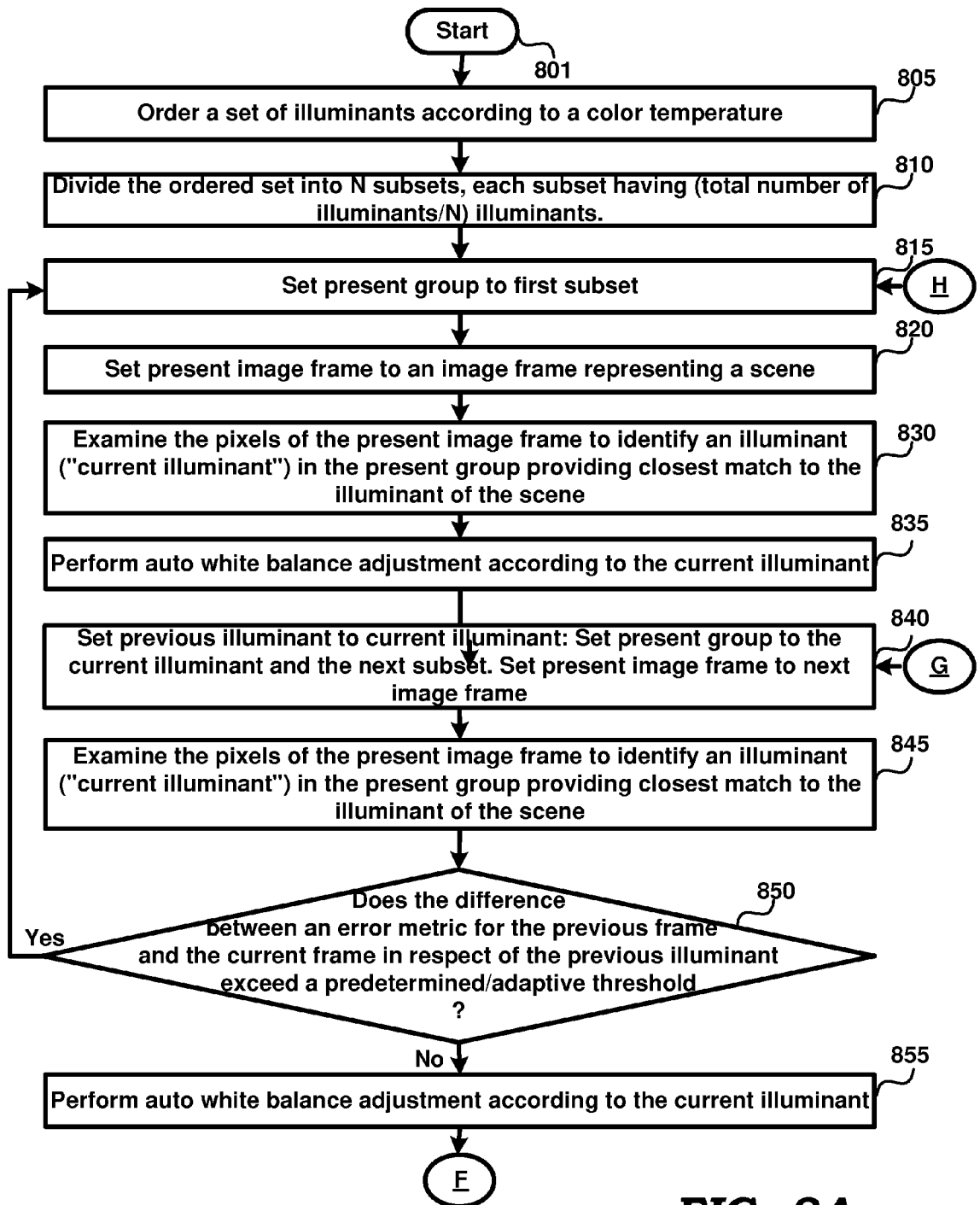
FIGS. 8A and 8B together illustrate an example approach for efficient determination of an illuminant of a scene in one more embodiment of the present invention.
Figure 8B:
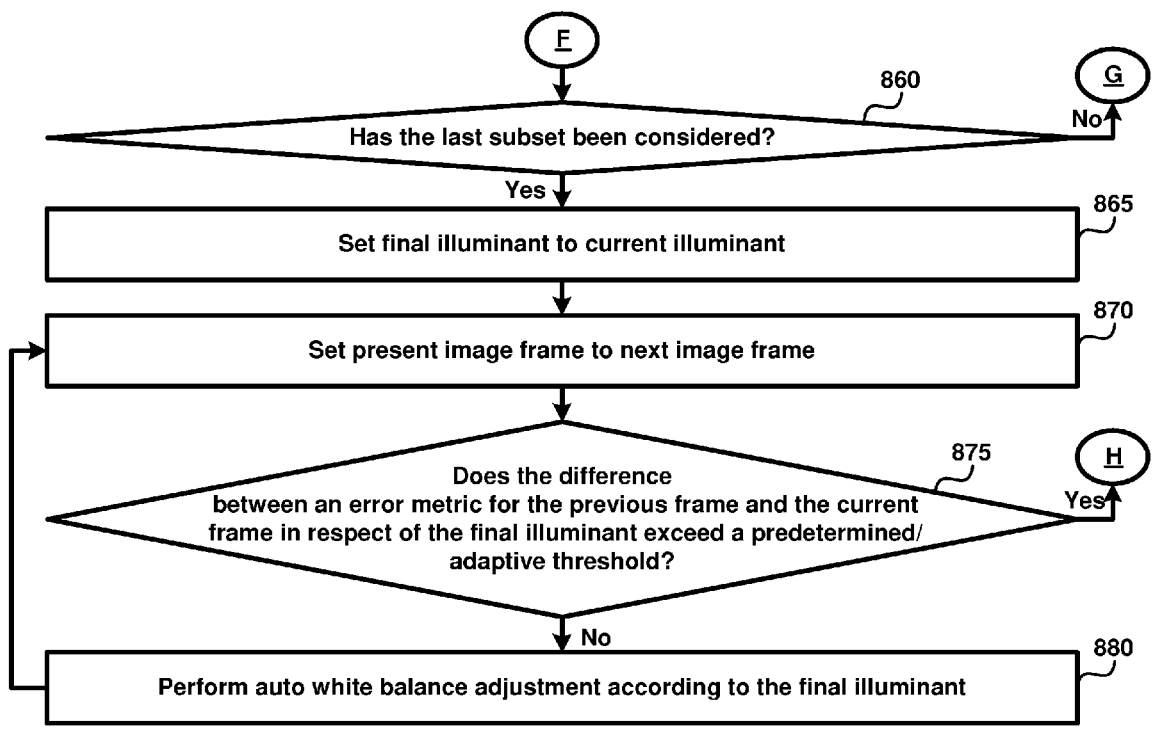

9. One More Example Approach to Determine an Illuminant of a Scene FIGS. 8A and 8B together include a flowchart illustrating yet another example approach using which an illuminant of a scene is determined. The flow chart is described with respect to FIGS. 1-7 merely for illustration. However, various features can be implemented in other environments and other components. Further more, the steps are described in a specific sequence merely for illustration.

Alternative embodiments in other environments, using other components, and different sequences of steps can also be implemented without departing from the scope and spirit of several aspects of the present invention, as will be apparent to one skilled in the relevant arts by reading the disclosure provided herein. The flowchart starts in step 801, in which control passes immediately to step 805.

Step 805 may be performed similar to step 505, described above with respect to FIG. 5. In step 810, CPU 350 divides the ordered set into 'N' subsets, with each subset having 'M' illuminants, where M may be determined by the expression Total number of illuminants/N. If M is a fraction, the next integer may be chosen as M, in which case the Nth subset will have fewer illuminants than the other subsets. For example, if 15 illuminants form the set of potential illuminants and if the set is to have 5 subsets, each subset will have 15/5=3 illuminants, whereas if the set is to have 4 subsets, each subset will have 15/4=3.75 illuminants. In this case, the next integer i.e. 4 may be chosen as the number of illuminants in each sub set and the Nth subset (in this case the fourth subset) will have only 3 illuminants.

Each subset may contain potential illuminants at either contiguous (e.g., positions 1, 2 and 3) or noncontiguous (e.g., positions 1, 5, and 9) illuminants in the ordered set. However, the subsets are considered to be ordered merely for ease of description below.

In step 815, CPU 350 sets the present group to the first subset. In step 820, CPU 350 receives an image frame, whose scene illuminant is to be identified, and sets a present image frame (which is processed, as described below) to the received image frame.

In step 830, CPU 350 identifies an illuminant among the illuminants in the present group, which provides the closest match to the illuminant of the scene. The identification is carried out using the techniques described before. The identified illuminant is referred to as the current illuminant.

In step 835, CPU 350 performs AWB adjustment, which may be performed similar to step 540 of FIG. 5 described above.

In step 840, CPU 350 sets the value for previous illuminant to the current illuminant, to be used for further processing. CPU 350 sets the next subset as the present group for the present image frame. The current illuminant for the previous image frame is added to the present group. CPU 350 also receives the next image frame whose scene illuminant is to be identified.

In step 845, CPU 350 identifies an illuminant among the illuminants in the present group, which provides the closest match to the illuminant of the scene. The identification is carried out using the techniques described before. The identified illuminant is referred to as the current illuminant.

In step 850, CPU 350 determines a respective error metrics of the previous illuminant versus the current frame and the previous frame, as described before. Thereafter, CPU 350 computes the difference between the two error metrics determined earlier. If the difference thus computed exceeds a threshold, the scene and/or the illuminant is deemed to have changed and the processing starts from 815. Otherwise, processing continues to step 855. The threshold may be a fixed threshold, or may be an adaptive threshold (which is determined dynamically).

In step 855, CPU 350 performs AWB adjustment, which may be performed similar to step 540 of FIG. 5 described above.

In step 860, CPU 350 checks whether the subset in the last position has been included in the present group. If not, processing continues from step 840.

If the subset in the last position has been included in the present group, all the illuminants have been considered for identifying the illuminant providing closest match to the illuminant of the scene. Assuming the scene or the actual illuminant has not changed, the closest matching illuminant may be accurately determined and control passes to step 865.

As may be appreciated for the description below, the illuminant providing the closest match to the illuminant of the scene identified from the present group is deemed to be the actual illuminant for all the subsequent image frames, until the difference in an error metric computed in step 875 exceeds a threshold. This illuminant is set as the final illuminant in step 865.

In step 870, CPU 350 receives the next image frame whose scene illuminant is to be identified.

In step 875, CPU 350 determines a respective error metrics of the final illuminant versus the current frame and the previous frame. For example, if the final illuminant is determined to be C, for respective successive frames F1 and F2, one error metric is computed for (C and F1 combination) and another error metric is computed for (C and F2 combination). Step 875 may be performed similar to step 561 described before. Thereafter, CPU 350 computes the difference between the two error metrics.

If the computed difference in the error metrics exceeds a threshold (fixed threshold or adaptive threshold) the scene and/or the illuminant is deemed to have changed, as described before, and the processing starts from step 815, to identify the final illuminant afresh.

If the error metric does not exceed a threshold, processing continues to step 880, where CPU 350 performs AWB adjustment according to the final illuminant, as described before. The control passes to step 870 to start a next iteration.

It may be noted that if the number of subsets N is large, the final illuminant is arrived at over more number of image frames whereas if the number of subsets is small, the number of illuminants to be processed to arrive at the current illuminant for an image frame (being processed before arriving at the final illuminant) will be more.

Though described in specific Figures/flowcharts merely for illustration, it should be appreciated that the individual features described above may be combined in different embodiments as suited for the corresponding environments. Such combinations are contemplated to be covered by various features of the present invention.

10. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A method of determining an illuminant associated with a portion of a captured image, said method comprising:
    ordering by a processor a set of potential illuminants according to ascending order of their color temperature that results in an ordered set, wherein said set of potential illuminants is independent from said captured image;
    selecting by the processor a first subset of illuminants from said ordered set, wherein said first subset of illuminants comprises illuminants in the even positions of the ordered set;
    selecting a current illuminant from said first subset of illuminants based on a closeness of illuminants of said first subset of illuminants to said illuminant associated with said portion of said captured image; and
    storing said current illuminant.

2. The method as described in claim 1 further comprising:
    determining correction parameters associated with said current illuminant.

3. The method as described in claim 1, wherein said selecting said current illuminant comprises:
    comparing each illuminant of said first subset of illuminants to said illuminant associated with said portion of said captured image.

4. The method as described in claim 1 further comprising:
    applying said current illuminant to said captured image.

5. The method as described in claim 1 further comprising:
    subsequent to said storing, receiving a next captured image;
    selecting a second subset of illuminants from said ordered set, wherein said current illuminant is common between said second subset of illuminants and said first subset of illuminants;
    selecting an updated illuminant from said second subset of illuminants based on a closeness of illuminants of said second subset of illuminants to an illuminant associated with said next captured image, wherein said updated illuminant is associated with said next captured image; and
    storing said updated illuminant.

6. The method as described in claim 5 further comprising:
    determining a first error associated with said current illuminant being applied to said captured image;
    determining a second error associated with said current illuminant being applied to said next captured image; and
    determining that said illuminant associated with said next captured image has changed from said illuminant associated with said captured image if a difference between said first error and said second error exceeds a threshold.

7. The method as described in claim 6, wherein said current illuminant is selected as said illuminant associated with said next captured image if said different is less than said threshold.

8. The method as described in claim 1, wherein said illuminant associated with said portion of said captured image comprises an average of pixels values in said portion of said captured image.

9. A computer readable medium comprising instructions that when executed implement a method for determining an illuminant associated with a portion of a captured image, said method comprising:
    ordering a set of potential illuminants according to descending order of their color temperature that results in an ordered set, wherein said set of potential illuminants is independent from said captured image;
    selecting a first subset of illuminants from said ordered set, wherein said first subset of illuminants comprises illuminants in the odd positions of the ordered set;
    selecting a current illuminant from said first subset of illuminants based on a closeness of illuminants of said first subset of illuminants to said illuminant associated with said portion of said captured image; and
    storing said current illuminant.

10. The computer readable medium as described in claim 9, wherein said method further comprises:
    determining correction parameters associated with said current illuminant.

11. The computer readable medium as described in claim 9, wherein said selecting said current illuminant comprises:
    comparing each illuminant of said first subset of illuminants to said illuminant associated with said portion of said captured image.

12. The computer readable medium as described in claim 9, wherein said method further comprises:
    applying said current illuminant to said captured image.

13. The computer readable medium as described in claim 9, wherein said method further comprises:
    subsequent to said storing, receiving a next captured image;
    selecting a second subset of illuminants from said ordered set, wherein said current illuminant is common between said second subset of illuminants and said first subset of illuminants;
    selecting an updated illuminant from said second subset of illuminants based on a closeness of illuminants of said second subset of illuminants to an illuminant associated with said next captured image, wherein said updated illuminant is associated with said next captured image; and
    storing said updated illuminant.

14. The computer readable medium as described in claim 13, wherein said method further comprises:
    determining a first error associated with said current illuminant being applied to said captured image;
    determining a second error associated with said current illuminant being applied to said next captured image; and
    determining that said illuminant associated with said next captured image has changed from said illuminant associated with said captured image if a difference between said first error and said second error exceeds a threshold.

15. The computer readable medium as described in claim 14, wherein said current illuminant is selected as said illuminant associated with said next captured image if said different is less than said threshold.

16. The computer readable medium as described in claim 9, wherein said illuminant associated with said portion of said captured image comprises an average of pixels values in said portion of said captured image.

17. A device comprising:
    an image input component operable to capture an image;

a memory component operable to store data, wherein said memory component is further operable to store a plurality of potential illuminants that is independent from a captured image; and a processor operable to order the plurality of potential illuminants according to descending order of their color temperature that results in an ordered set, wherein said processor is further operable to select a first subset of illuminants from said ordered set, wherein said first subset of illuminants comprises illuminants in the even positions of the ordered set, wherein said processor is further operable to select a current illuminant from said first subset of illuminants based on a closeness of illuminants of said first subset of illuminants to an illuminant associated with a portion of said captured image, and wherein said processor is further operable to store said current illuminant with said memory component.

18. The device as described by claim 17, wherein said image input component comprises:

a lens assembly; and an image sensor array operable to receive light associated with said captured image, and wherein said image sensor array is operable to generate a plurality of pixel values associated with said captured image.

19. The device as described by claim 17, wherein said processor is further operable to determine correction parameters associated with said current illuminant.

20. The device as described by claim 17, wherein said processor is further operable to compare each illuminant of said first subset of illuminants to said illuminant associated with said portion of said captured image for selection of said current illuminant.

\* \* \* \* \*